(12) United States Patent
Corliss

(10) Patent No.: US 6,771,949 B1
(45) Date of Patent: Aug. 3, 2004

(54) METHOD AND SYSTEM FOR PROVIDING SHORT MESSAGE SERVICES OUTSIDE OF THE WIRELESS NETWORK

(75) Inventor: James R. Corliss, Thornton, CO (US)

(73) Assignee: Qwest Communications International, Inc., Denver, CO (US)

( * ) Notice: Subject to any disclaimer, the term of this patent is extended or adjusted under 35 U.S.C. 154(b) by 882 days.

(21) Appl. No.: 09/169,757

(22) Filed: Oct. 9, 1998

(51) Int. Cl.⁷ ............................................. H04M 11/10
(52) U.S. Cl. ..................... 455/413; 455/414.1; 455/466
(58) Field of Search ................................. 455/412, 413, 455/415, 426, 554, 555, 556, 466, 67.7, 70, 412.1; 379/67, 89, 70

(56) References Cited

U.S. PATENT DOCUMENTS

| | | | | |
|---|---|---|---|---|
| 5,177,780 A | * | 1/1993 | Kasper et al. ................. | 379/59 |
| 5,706,211 A | * | 1/1998 | Beletic .................... | 364/514 R |
| 5,742,905 A | * | 4/1998 | Pepe et al. ................... | 455/461 |
| 5,802,466 A | * | 9/1998 | Gallant et al. ............... | 455/413 |
| 5,870,549 A | * | 2/1999 | Bobo, II ................ | 395/200.36 |
| 5,946,630 A | * | 8/1999 | Willars et al. ............... | 455/466 |
| 6,002,751 A | * | 12/1999 | Shaffer .................... | 379/88.18 |
| 6,006,087 A | * | 12/1999 | Amin .......................... | 455/413 |
| 6,014,559 A | * | 1/2000 | Amin .......................... | 455/413 |
| 6,014,711 A | * | 1/2000 | Brown ........................ | 709/245 |
| 6,067,529 A | * | 5/2000 | Ray et al. ...................... | 705/26 |
| 6,087,956 A | * | 7/2000 | Helferich ............... | 340/825.44 |
| 6,088,720 A | * | 7/2000 | Berkowitz et al. .......... | 709/206 |
| 6,091,947 A | * | 7/2000 | Sumner ...................... | 455/413 |

* cited by examiner

Primary Examiner—Congvan Tran
(74) Attorney, Agent, or Firm—Brooks Kushman P.C.

(57) ABSTRACT

A method is disclosed for providing voice messaging notification to a voice mail subscriber over the Internet, wherein the subscriber has a telephone which is serviced by a switch. The method includes receiving a voice message from a calling party for the telephone associated with the subscriber and forwarding the voice message to a mailbox for storage therein. The method also includes generating the message notification upon receipt of the voice message and transmitting the message notification to a messaging notification node. The method further includes routing the message notification to the subscriber over a local Internet gateway to provide indication to the subscriber of the stored voice message. In a preferred embodiment, the method also routes the messaging notification to a server corresponding to or designated by the subscriber, or corresponding to a paging service provider or e-mail service provider, in which the method includes generating a paging signal to a pager of the subscriber, or e-mail message including the message notification.

25 Claims, 3 Drawing Sheets

| WIRELESS PHONE NUMBER | SUBSCRIBER DELIVERY DESTINATION |
|---|---|
| (303) 555-1234 | USWEST.COM MAIL SERVER PAGING SERVICE PROVIDER SERVER |
| (303) 555-2345 | NAME1@USWEST.COM |

*Fig. 2*

METHOD AND SYSTEM FOR PROVIDING
SHORT MESSAGE SERVICES OUTSIDE OF
THE WIRELESS NETWORK

TECHNICAL FIELD

This invention relates to a method and system for providing voice mail notification services outside of the wireless network.

BACKGROUND ART

Voice mail systems, which are also known as voice messaging systems, have become an integral mode of communication in society, amongst businesses and individuals alike. If a call from a caller to a subscriber of a voice mail system is not answered or otherwise completed, the call is forwarded to the voice mail system wherein the caller may leave a voice message in the subscriber's voice "mailbox".

In the wireless network, subscribers are notified of new voice mail in their wireless voice mail box through message notifications issued through the short message service (SMS). The SMS utilizes predefined message notifications that are used to supply voice mail notification to the subscriber's wireless handset. In the wireline network, the voice mail unit sends a message to the switch serving the subscriber via a Simplified Message Desk Interface (SMDI). Accordingly, when a caller calls a telephone number associated with a subscriber's telephone and is unable to be connected to the subscriber, the caller may leave a voice message for the subscriber in the subscriber's voice mailbox. At this time, the corresponding wireline or wireless service provider servicing the telephone provides an indication to the subscriber at the telephone that she has a voice message in her mailbox. This manner of notifying a subscriber that she has messages waiting in her voice mailbox may often prove to be time consuming and inefficient, especially when the subscriber is not near a phone or is otherwise unable to receive the voice mail messaging notification.

Subsequently, in order to retrieve messages left in the mailbox, the subscriber must dial an access number in order to retrieve messages associated with her handset or telephone.

Consequently, there exists a need for allowing a voice mail subscriber to be notified in a timely and efficient manner that a voice message has been left in her voice mailbox. The voice mail subscriber should also be able to be notified of the existence of voice mail messages in her mailbox when she is not near a telephone or is otherwise unable to receive the appropriate messaging. Such will allow the subscriber to retrieve voice mail messages associated with her telephone/handset in a timely and efficient manner.

SUMMARY OF THE INVENTION

It is a principal object according to the present invention to provide a system and method for notifying a voice mail subscriber of messages in her voice mailbox, in a timely and efficient manner.

It is another object according to the present invention to provide voice messaging services to enable a subscriber to retrieve voice mail messages associated with her telephone in a more timely and efficient manner.

It is a further object according to the present invention to provide a method and system for allowing a subscriber to be notified of and to retrieve voice mail messages left in her voice mailbox.

It is still another object according to the present invention to provide a means for through which a subscriber may be notified of messages in her voice mailbox which is easily accessible and/or mobile.

It is yet another object according to the present invention to extend wireless voice mail notification services to voice mail subscribers outside of the wireless network.

And it is still another object according to the present invention to provide voice mail notification services over the Internet.

In carrying out the above objects, features and advantages of the present invention, provided is a method for providing voice message notification to a voice mail subscriber over the Internet. The subscriber has a telephone serviced by a corresponding switch. The method includes receiving a voice message from a calling party for the subscriber, and further includes forwarding the voice message to a mailbox for storage therein. Also included is generating the message notification upon receipt of the voice message. The message notification is of the SMS type, which is currently is operable only within the wireless network. The method also includes transmitting the message notification to a messaging service node, and routing the message notification to the subscriber over a local Internet gateway to provide indication to the subscriber of the stored voice message.

In a preferred embodiment, the message notification is via Short Message Service (SMS). It also includes routing the SMS messaging notification to a server designated by the subscriber or designated by a service provider. In yet another preferred embodiment, the method of this invention includes routing the message notification to a server of a paging service designated by the subscriber or by a service provider. In such an embodiment, a paging signal including carrying the message notification is generated and routed to a pager of the subscriber. Further, the method may also include transmitting the message notification to the wireless switch if the subscriber is also a wireless subscriber and to the wireline switch if she is a wireline subscriber.

Moreover, in another embodiment according to the present invention, the method includes routing the message notification to a mail server of an e-mail service corresponding to or designated by the subscriber. Such embodiment may include generating an e-mail message carrying the message notification and routing it to a predetermined e-mail address corresponding to or designated by the subscriber.

Another embodiment of a method according to the present invention is for use in a communication network having at least one switch which serves a subscriber having a telephone. This method of routing a voicemail message notification over the Internet to the subscriber includes providing an Internet gateway which is in communication with the communication network. Also included is to provide a voice response unit for receiving voice mail messages and an adjunct processor which is in communication with the Internet gateway. The method further includes providing a database in communication with the adjunct processor, where the database includes a server identifier or address designated by or corresponding to the subscriber. Another method step includes detecting at the adjunct processor an SMS message notification generated and transmitted by the voice response unit, indicating that the subscriber's voice mailbox has a message therein. Further included is determining at the adjunct processor a destination server address for the subscriber. Such server address may be predetermined or may be one of the multiple which are available in response to various conditions. The message notification is then routed to a local Internet gateway. Further included is transmitting from the adjunct processor to the local Internet gateway the determined destination server for the subscriber. Lastly the message notification is routed to the determined destination server. The server performs a query or look-up to a database to determine a corresponding subscriber e-mail address and routes the message notification to the determined e-mail address. In another embodiment, the determined destination server is an e-mail service server wherein an e-mail message is generated which includes the message notification to a corresponding e-mail address associated with or designated by the subscriber.

As discussed, preferred embodiments of this method may include translating the message notification into a protocol used by the Internet gateway in order to be accepted and/or delivered thereby. In another embodiment, the designated destination server is a paging service server. Thus, a paging signal is generated which includes the message notification and routed to a corresponding pager associated with the subscriber.

Yet, another method according to the present invention is disclosed for use in a communications network which has an adjunct messaging processor serving a messaging device, which may be an alphanumeric pager, a computer terminal, etc. The method includes routing a voice mail message notification over the Internet as part of a messaging signal. Such routing includes routing the message notification from a voice response unit to the messaging processor over the Internet. This routing also includes providing a database in communication with the messaging processor, wherein the database has a profile for each voice mail subscriber, so that the profile includes a destination server. It also includes generating a messaging signal for receipt by the messaging device, and the messaging signal includes the SMS voice mail message notification. As with the other embodiments, the destination may be a paging service server which is alerted to generate a paging signal to a pager of the subscriber. It may also be an e-mail service server or mail server for generating an e-mail signal to a pager of the subscriber.

In accordance with the teachings of the present invention, also provided herein is a system for providing voice messaging notification to a subscriber. The system has a switch which supplies telecommunication services to the subscriber. Also included is a voice response unit which is coupled to the switch and is operative to receive an uncompleted call from a calling party to the telephone associated with the subscriber, forward the call to a voice response unit and receive a voice mail message in a subscriber mailbox for storage therein, and transmit a message notification upon receipt of the voice message at the mailbox to provide an indication over the Internet to the subscriber of the stored voice message. This message is received by the subscriber at a message receiving device. In a preferred embodiment, the voice response unit, in transmitting the message notification, operates to transmit an SMS message notification to a service or processing node.

Another system embodiment according to the present invention is for use in a communication network for routing a wireless voice mail message notification to a subscriber. The system includes an Internet gateway in communication with the communication network. Also included is a database which has a list of subscriber e-mail addresses corresponding to each subscriber's voice mailbox. An adjunct processor is provided in communication with the voice response unit and the Internet gateway. The adjunct processor is operative to determine a destination server/e-mail address for the subscriber, instruct the SMS node to route the voicemail message notification to a local Internet gateway, and transmit to the Internet gateway the determined e-mail address for the subscriber.

These and other objects, features, and advantages of the present invention are more readily apparent from the following detailed description of the best modes for carrying out the invention when taken in connection with the accompanying drawings wherein like reference numerals correspond to like components.

BRIEF DESCRIPTION OF THE DRAWINGS

FIG. 2 is a diagram illustrating an example of information flow diagram illustrating the general sequence of the method according to the present invention.

BEST MODE FOR CARRYING OUT THE INVENTION

Figure 1:
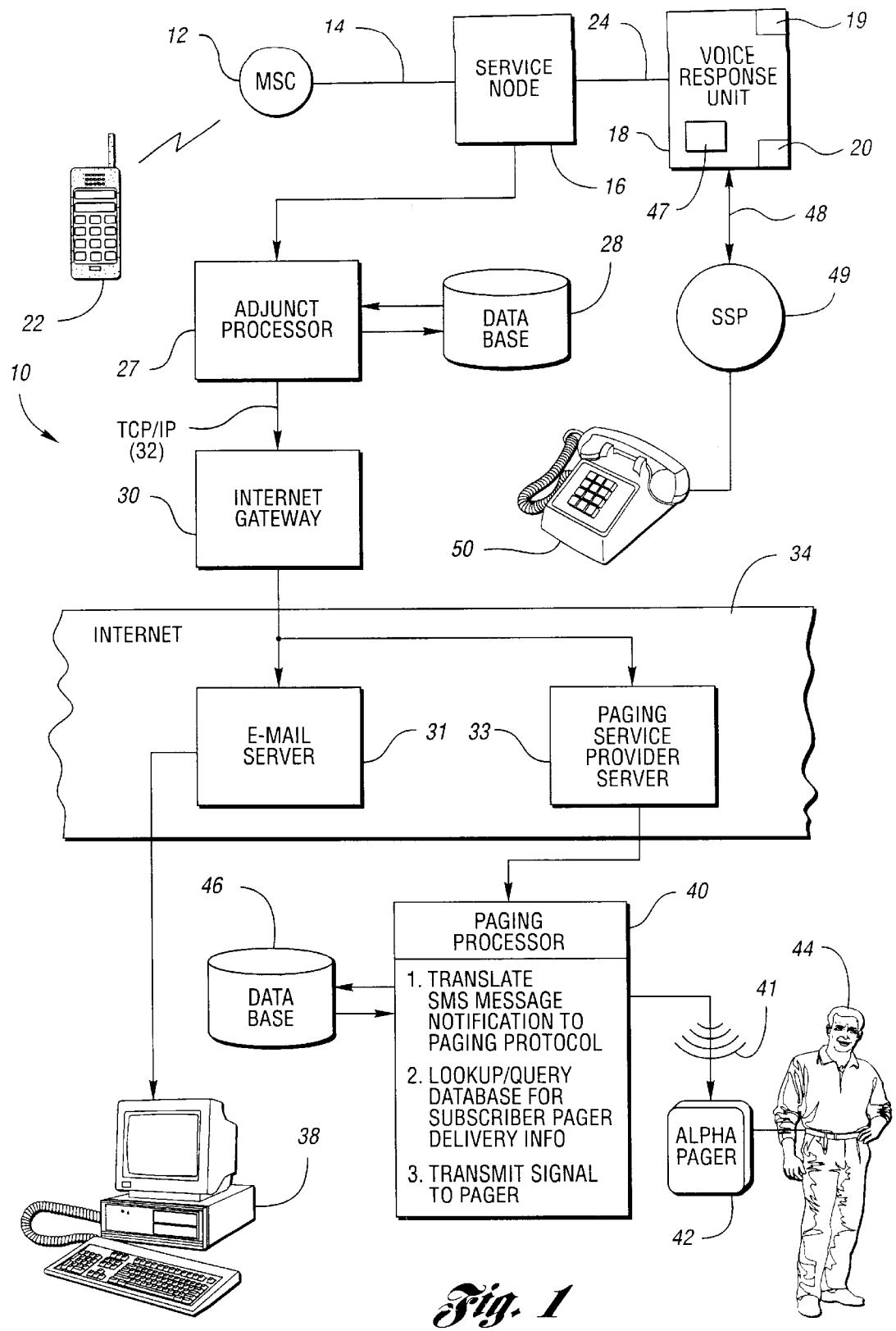
FIG. 1 is a schematic diagram illustrating the system according to the present invention.

With reference to FIG. 1 of the drawings, there is shown a schematic diagram illustrating the wireless voice messaging system according to the present invention, denoted generally by reference numeral 10. The voice messaging system includes at least one wireless switch 12 (or Mobile Switching Center (MSC)) which is connected via Signaling Service System 7 (SS7) links 14 to a service node 16. Wireless switch 12 provides wireless services to wireless subscribers, such as to a user of a wireless handset 22 (for purposes of the invention described herein, handset 22 and telephone 50 will both be referred to as a "telephone".)

Service node 16 is a node, acting as a Short Message Service Center (SMSC), as is known in the art in the IS-41 industry standards, which is capable of transferring Short Message Service (SMS) messages and signals, as is discussed further herein. SMS messages are also known in the art as an IS-41 architecture industry standard. System 10 further includes a voice response unit 18 (also known as a voice messaging unit) for receiving, storing, and playing voice mail messages left for voice mail subscribers. Voice response unit 18 is of a type such as the Sierra® model manufactured by Octel Messaging Division of Lucent Technologies, in Milipitas, Calif.

Voice response unit 18 includes at least one voice mailbox 19 which corresponds to or is associated with a subscriber of voice mail system 10. Depending on whether the subscriber is also a wireless or wireline subscriber, incoming voice mail messages for each subscriber are stored in the subscriber's voice mailbox 19, representing a wireless subscriber voice mailbox, or voice mailbox 47, representing a wireline voice mailbox. Each voice mailbox 19,47 is typically associated with a subscriber's respective telephone number, but it is contemplated that mailboxes 19,47 may also be identified with a subscriber in a variety of other ways known in the art. Voice response unit 18 also includes control logic 20 for determining into which mailbox to place the voice message. In the wireless network, control logic 20 communicates with service node 16 for generating messages for receipt by wireless switch 12 instructing switch 12 to provide the voicemail message notification services to the subscriber. Control logic 20 also generates the Short Message Service (SMS) messages to a subscriber, as is discussed further herein. The messages are transmitted via a command language suitable to this application and the relevant node, such as the Octel Command Language (OCL)™. In a wireline network, control logic 20 notifies telephone 50 of the message notification, such as a stutter dial-tone or other similar indicator, via a wireline switch 49 (such as Service Switching Point (SSP)). Other similar indicators may include a voice message light attached to telephone 50.

Typically, when a voice mail message is left for a subscriber of telephone 22,50, system 10 operates to provide an indication to the subscriber at various locations, including telephones 22,50 of a voice mail message in voice mailbox 19,47 of voice response unit 18. In order to transmit the SMS message notification to wireless handset 22, a hardwire data link 24 is provided between voice response unit 18 and SMS service node 16. This data link 24 is often a physical data link, and more particularly may be an X.25 data link, and still more particularly may be of the SMS data link type, as these types of links are known in the art. Another link 14 is provided between SMS service node 16 and wireless switch 12, which is an SS7 link. Thus, voice response unit 18, upon receipt and storage of a voice mail message in a subscriber's mailbox 19, generates an SMS message notification signal across data link 24 to service node 16. The signal indicates the presence and number of voice mail messages in a voice mailbox corresponding to a particular subscriber/wireless phone number. Wireless switch 12 then interprets the message and similarly activates an indication at wireless handset 22 to notify the subscriber that she has a message. Such notification is typically achieved by an SMS text message notification which may appear on a display of handset 22 to indicate to the subscriber/user that one or more messages are present in her voice mailbox 19. Such SMS text message may also be accompanied by beep tone, flashing light or other message indicator with the handset 22.

The wireline network may also include a Simplified Message Desk Interface (SMDI) 48, which is well known in the art of telecommunications. SMDI link 48 is a two-way data link which transmits the subscriber's telephone number to voice response unit 18 when a calling party is transferred there in order to leave a message for the subscriber, allowing control logic 20 to translate the telephone number into the subscriber's mailbox number. As mentioned, SMDI link also serves to provide an indication to the subscriber that he/she has a voice message in their mailbox. Thus, in the wireline network, upon receiving and storing a voice message in a subscriber's mailbox 47, voice response unit 18 signals wireline switch 49, which generates a message notification to switch 49, instructing switch to turn on the voice mail notification at telephone 50. As discussed further herein, the voice mail notification is commonly in the form of a stutter dial-tone.

On the other hand, in the wireless network, upon receiving and storing a voice message in a subscriber's mailbox 19, voice response unit 18 signals service node 16 via link 24, which in turn instructs switch 12 (which is servicing handset 22) via link 14 to turn on voice mail notification at handset 22, or provide another similar indicator to the subscriber. In other words, wireless switch 12 interprets the message and similarly activates an indication at wireless handset 22 to notify the subscriber that she has a message.

In accordance with the teachings of the present invention disclosed herein, SMS message notification is provided to the subscriber outside of the wireline and wireless networks. Particularly, the SMS message notification is routed through the Internet to a voice mail subscriber at one or multiple locations or message receiving devices. A first type contemplated is computer messaging notification such as including delivery via electronic mail (e-mail) and the Internet or World Wide Web. A second type contemplated is messaging notification via a mobile or wireless pager. Each of these types of messaging notification delivery is accomplished via an Internet gateway.

In further keeping with the teachings of the present invention, an adjunct processor 27 is provided in system 10 in communication with service node 16. Adjunct processor 27 is also provided in communication with a routing and mapping database 28 (or other suitable look-up source). As shown in association with FIG. 2, database 28 is operative to store a list of predetermined servers (such as mail server 31 or paging service server 33 or other) or e-mail addresses associated with or corresponding to the subscriber (and more particularly corresponding to the subscriber's voice mailbox identifier or telephone number). With reference to FIG. 2, note that database 28 has stored therein for each subscriber telephone number a server or e-mail address that has been designated by the subscriber or by the service provider as the respective subscriber SMS message delivery destinations outside of the wireless and wireline networks. In other words, the delivery destination is preferably predetermined and existing in database 28. For example as shown in FIG. 2, the subscriber having wireless mobile telephone number (303) 555-1234 has designated a server for an e-mail provider and a server for a paging service provider; the subscriber having number (303) 555-2345 has designated an e-mail address only. Of course, e-mail address (such as "name@USWEST.com") includes the server address USWEST.com.

An Internet gateway 30 is further provided in communication with adjunct processor 27. Gateway 30 is understood by those skilled in the art to be a device or means used to connect dissimilar networks. That is, gateway 30 is operative to connect networks which use different communication protocols so that information can be passed from one network to the other. Unlike a bridge, which transfers information between similar networks, a gateway both transfers information and converts it to a form compatible with the protocols used by the second network for transport and delivery. Gateway 30 may be a separate or integral component with adjunct processor 27.

As will be explained in further detail herein, local Internet gateway is thus operative to transmit and convert SMS message notifications from a form compatible with the protocol used by the wireless network to a form compatible with the protocol used by the Internet. At present, the Internet, which is designated generally by reference numeral 34, is operative on what is known as the Transmission Control Protocol/Internet Protocol (TCP/IP) 32. Again, this protocol and the generalized operation of an Internet gateway are well known to those skilled in the art and need not be discussed in further detail herein.

As specified above, service node 16 receives the SMS message notification signal. Service node 16 transmits the signal to adjunct processor 27, which via reference to database 28 (see FIGS. 1 and 2), queries the database 28 and identifies the subscriber's corresponding destination server or e-mail address and directs service node 16 to route the SMS message notification to one or more of the specified delivery destinations via local Internet gateway 30, where it is stored electronically. As mentioned, multiple delivery destinations may be predefined by the subscriber. For example, a subscriber may desire to receive the message notification at her e-mail address, her pager, or both. However, it is contemplated that different delivery locations may be specified for delivery under various conditions. For example, the subscriber may desire to have the message notification delivered to her pager during the evening and on weekends, while choosing to receive such message notifications by e-mail during normal business hours.

Thereafter, adjunct processor 27 transmits the delivery destination server or e-mail address of the subscriber to local Internet gateway 30 for delivery of the SMS message notification. As previously noted, Internet gateway 30 is operable to translate the SMS message notifications and the delivery destination, if necessary, to Internet protocol. Gateway 30 then transmits the message notification to the subscriber at the designated server/e-mail address. Such message notification is then accessible to the subscriber at a computer terminal 38 or any other messaging devices operable to access servers or e-mail addresses, or to otherwise receive such messages. Thus the subscriber may check her e-mail messages on her computer terminal 38, and receive the translated wireless voice mail message notification. Of course, such information may be password protected by the subscriber, as well. Messaging service 10 thus allows callers to leave a message in a subscriber's voice mailbox, and proceeds to generate notification signals to the subscriber at one or many various locations, such as an alphanumeric paging device, computer terminal, server, or other suitable output device.

Referring still to FIG. 1 of the drawings, the basic message notification process according to the present invention is further described with reference to an SMS message notification delivered via a paging device, such as an alphanumeric pager 42. As shown, the method and system are for use in a communications network 10 having a paging processor 40 which serves at least one paging device 42 associated with a paged party/subscriber 44. As with previous embodiments, the SMS message notification is received by Internet gateway 30, along with a delivery destination. In this embodiment, however, the destination is contemplated to be a server 33 servicing a paging service provider. The paging service provider receives the message notification and the subscriber identifying information, then transmits a signal to a paging processor 40, so that the subscriber may receive the message notification via pager 42.

Following receipt of the page request signal by paging processor 40, the SMS message notification is translated to paging protocol by paging processor 40. At least one database 46 is provided in communication with paging processor 40, which is operative to query database 46 for the necessary subscriber pager delivery information. The at least one database 46 includes a list of subscriber information or a subscriber look-up table having corresponding subscriber information. The database is consulted and the subscriber identifying information (such as wireless or wireline telephone number) is matched with any or all of the subscriber's designated paging device identifying codes. The database returns the query result which includes the pager identifying information to which the particular message notification should be delivered, as originally designated by the subscriber. Moreover, the SMS message notification signal is translated by paging processor 40 into a paging protocol from the Internet protocol from which the message is received. Finally, a paging signal 41 is generated for receipt by the paging device 42. The paging signal 41 has a data field which communicates the (translated) SMS message notification to the subscriber at her pager 42. Paging processor 40 then transmits the signal to the designated paging device 42, which upon receipt reflects notification and alerts the subscriber/user of pager 42 of the wireless voice mail message notification, such as on the LCD or other portion of the device, which may for example, display in text format that the subscriber has one or more voice mail messages in her voice mailbox, which may also include an indication as to which have been designated by the calling party as Urgent. As with the other delivery destinations, this message notification signal at pager 42 alerts subscriber 44 that at least one voice mail message awaits in the voice mailbox. Again, this message may be accompanied by a auditory or visual notification, such as a beeping tone, or a flashing light.

It is to be understood, however, that the invention described herein is applicable to all messaging systems capable of being delivered via the Internet, including but not limited to, e-mail, voice-mail, and Web-based systems. Regardless of the application, the invention includes delivering SMS message notifications to a peripheral via the Internet.

Figure 3:
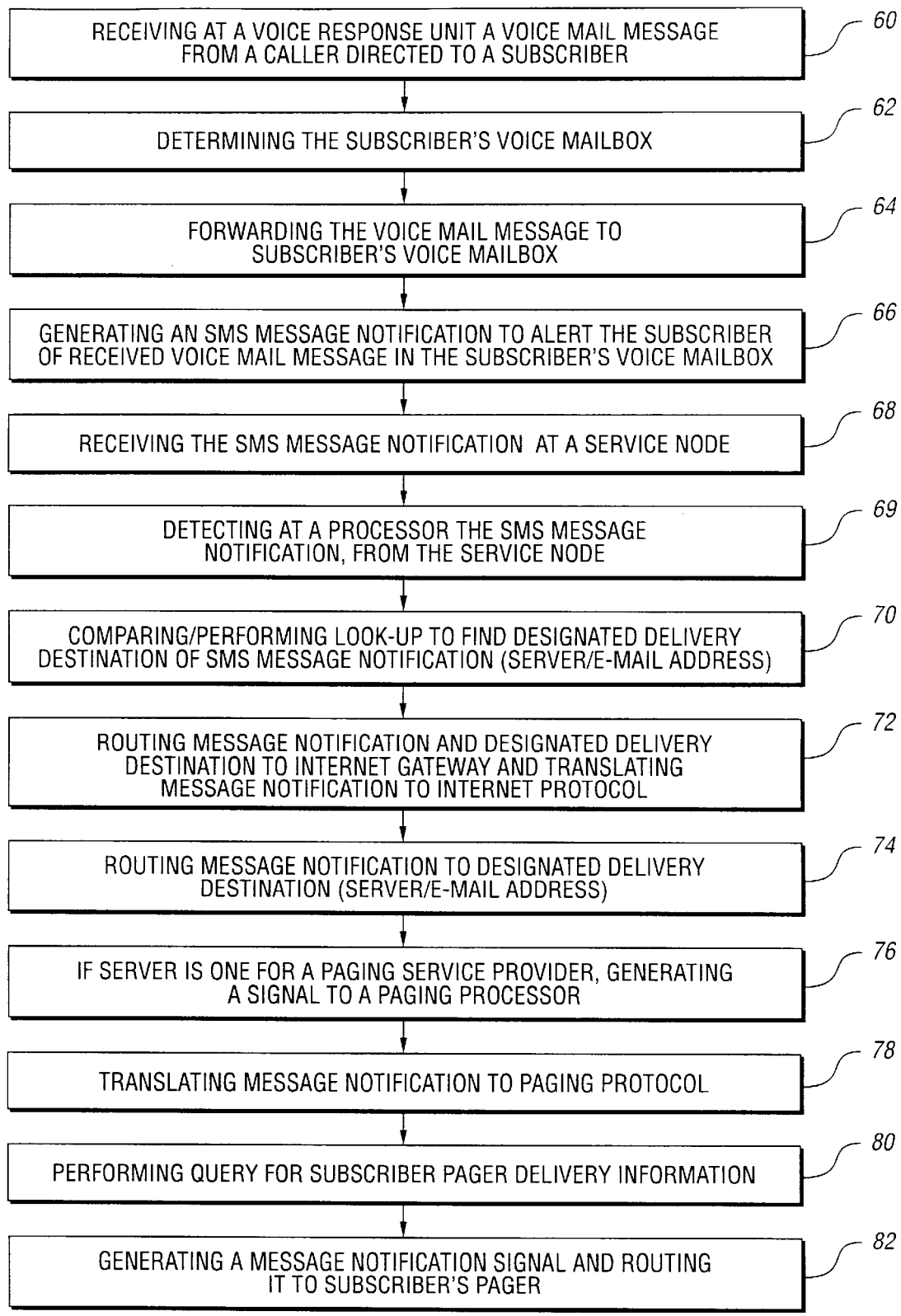
FIG. 3 is a flow diagram illustrating the general sequence of the method according to the present invention.

Further, with reference to FIG. 3 of the drawings, there is shown a block diagram of the generalized method steps of the present invention as applied to the SMS notification messaging system. As indicated above, the method is directed for use with a wireless and/or wireline communication network which is in communication with the Internet. The methods disclosed herein are operative to identify and transmit SMS voice message notification as part of a paging signal and/or e-mail message.

A method is set forth for providing voice messaging notification to a voice mail subscriber over the Internet. The wireless subscriber has a wireless handset telephone 22 which is serviced by a wireless switch (MSC) 12. The wireline voice mail subscriber has a wireline telephone 50 which is serviced by a wireline switch 49. An incoming call is placed to a telephone number corresponding to the subscriber's telephone. In the situation that there is either no answer by the subscriber at the telephone 22,50, a busy signal is received by the caller, the telephone 22,50 handset is in inactive mode, or the call is otherwise incomplete, the incoming call is forwarded by the respective switch 12,49 and received by the voice response unit 18 (shown at block 60). Voice response unit 18 receives 62 the call from wireless switch 12 via data links 14 and 24.

The control logic 20 of voice response unit 18 then determines the mailbox number for the called party, as shown at block 62. This is typically accomplished by comparing and matching the called number with a list of mailbox numbers to determine the mailbox number associated with the called party. Control logic 20 generates SMS message notification upon receipt of the voice message (shown in block 66), which is transmitted to a service node over data link 24 (shown as block 68). Service node 16 transmits to adjunct processor 27 the message notification and subscriber identifying information, which then queries a database (28) for delivery information corresponding to the subscriber (shown as block 70). The method includes routing the message notification to the subscriber over a local Internet gateway to provide indication to the subscriber of the stored voice message (shown as block 72).

In a preferred embodiment, the method further includes routing the messaging notification to a server designated by or corresponding to the subscriber (as shown in block 74). As previously discussed, this server serves a paging service provider or e-mail service provider which is available for conveying messages or signals to the subscriber. As set forth below, the server may also be associated with a mobile/cellular paging service for signaling an alphanumeric pager of the subscriber with the SMS message notification.

In another embodiment, a method according to the present invention is provided for routing voicemail SMS message notifications over the Internet to the subscriber. The method is provided for use in a communication network having at least one voice response unit serving at least one subscriber. Further provided is detecting at the adjunct processor a message notification from the subscriber's voice mailbox (shown as block 68). Also included is providing an adjunct processor in communication with a service node and the at least one Internet gateway (shown as block 70). At least one database is provided in communication with the adjunct processor, where the at least one database includes at least one designated destination server or e-mail address which corresponds to or is designated by the subscriber (shown as block 70). Also included is determining at the adjunct processor a designated destination server/e-mail address for the subscriber (shown as block 70). The method includes providing at least one Internet gateway in communication with the communication network (shown as block 72).

The message notification and determined destination server or e-mail address is routed to a local Internet gateway (shown as block 72). The method includes translating the message notification into a protocol used by the Internet gateway, which said protocol is preferably Transmission Controlled Protocol/Internet Protocol (shown as block 72). Moreover, included is routing the message notification to the determined destination server/e-mail address (shown as 74). The message notification is then available to be received by the subscriber, preferably at a computer terminal having the requisite Internet access or access to an e-mail provider's server to retrieve his/her e-mail. Another embodiment is for a method wherein the determined destination server is an e-mail provider's server. The method further includes transmitting the (translated) SMS message notification to the server which performs a query or lookup for the subscriber's designated email address. An e-mail message which includes the message notification is then generated to the predefined e-mail address for the subscriber.

In another embodiment, the designated server may be a paging service provider server. Thus in addition to the above steps, the method further includes generating a paging signal including the message notification to a paging processor which corresponds to or is associated with the subscriber (shown as block 76). The paging processor itself serves as a gateway which translates the voice mail message notification and subscriber pager identifying information to paging protocol for delivery to the subscriber's designated pager.

In keeping with the teachings of this embodiment, disclosed is a method for providing voice messaging notification for a subscriber who has a voice mailbox. In a preferred embodiment, the destination server is a paging service provider server. The server signals a paging processor (such as processor 40 shown in FIG. 1). The method includes translating the SMS messaging notification to paging protocol (shown as block 78). A lookup or query by the paging processor is performed 80 to a database to determine subscriber identifying paging information to identify the subscriber's pager (shown as pager 42 in FIG. 1). The paging signal is generated and the translated SMS message notification is delivered to the subscriber's designated pager (shown as block 82).

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A method for providing voice messaging notification to a voice mail subscriber over the Internet, the voice mail subscriber having a telephone serviced by one of a wireless and wireline switch, the method comprising:

receiving a voice message from a calling party for the telephone associated with the voice mail subscriber;

forwarding the voice message to a mailbox for storage therein;

generating a Short Message Services message notification upon receipt of the voice message;

transmitting the message notification to a messaging service node; and routing the message notification to the voice mail subscriber over a local Internet gateway to provide indication to the voice mail subscriber of the stored voice message.

2. The method of claim 1 further comprising routing the message notification to a server designated by the subscriber.

3. The method of claim 2 wherein routing the message notification to a server is routing to a server of a paging service provider.

4. The method of claim 3 further comprising generating a paging signal carrying the message notification to a pager of the subscriber.

5. The method of claim 2 wherein routing the message notification to a server is routing to a mail server for an e-mail service provider.

6. The method of claim 5 further comprising generating an email message carrying the message notification to an e-mail address corresponding to the subscriber.

7. For use in a communication network having at least one switch serving at least one subscriber having a telephone, a method of routing a voicemail message notification over the Internet to the subscriber, the method comprising:

providing at least one Internet gateway in communication with the communication network;

providing an adjustment processor in communication with a messaging service node and the at least one Internet gateway;

providing at least one database in communication with the adjunct processor, the at least one database including at least one designated destination server corresponding to the subscriber;

detecting at the service node a Short Message Services message notification from the subscribers's voice mailbox;

transmitting the message notification to adjunct processor;

determining at the adjunct processor the at least one designated destination server for the subscriber;

routing the message notification to the at least one local Internet gateway;

transmitting from the adjunct processor to the local Internet gateway the at least one designated destination server for the subscriber; and routing the message notification to the at least one designated destination server.

8. The method as in claim 7 further comprising translating the message notification into a protocol used by the Internet gateway.

9. The method as in claim 8 wherein the protocol used by the Internet gateway is Transmission Controlled Protocol/Internet Protocol.

10. The method as in claim 7 wherein the at least one designated destination server includes a server of a paging service provider.

11. The method as in claim 10 further comprising generating a paging signal including the message notification to a corresponding pager for the subscriber.

12. The method as in claim 7 wherein the at least one designated destination server includes a server of an e-mail service provider.

13. The method as in claim 10 further comprising generating an e-mail message which includes the message notification to a corresponding e-mail address for the subscriber.

14. A method for providing voice messaging notification for a subscriber having a telephone serviced by at least one of the public wireless and wireline networks, the method comprising:
receiving a voice mail message from a calling party calling the telephone associated with the subscriber;
forwarding the voice mail message to a subscriber mailbox for storage therein;
generating a Short Message Services (SMS) message notification to an Internet gateway in communication with the at least one of the public wireless and wireline networks; and
routing the SMS message notification to the Internet gateway to provide an indication to the subscriber of the stored voice mail message.

15. For use in a communications network having a messaging processor serving at least one messaging device, a method of routing a messaging signal over the Internet, comprising:
routing a Short Message Services (SMS) message notification from a service node to the messaging processor over the Internet;
translating the message notification in the messaging processor:
providing at least one database in communication with the messaging processor, the at least one database having a profile for each voice mail subscriber, the profile including a predetermined destination server; and
generating a messaging signal for receipt by the at least one messaging device to the predetermined destination server, the messaging signal including the message notification.

16. The method of claim 15 wherein the predetermined destination server is a server of a paging service provider.

17. The method of claim 15 further comprising generating a paging signal to a pager of the subscriber.

18. The method of claim 15 wherein the predetermined destination is a server of an e-mail provider.

19. The method of claim 15 further comprising generating an email signal to a pager of the subscriber.

20. A system for providing voice messaging notification for a subscriber having a telephone in one of the wireless and wireline networks, the system comprising:
a switch providing telecommunications services to the telephone;
a voice response unit coupled to the switch operative to receive a voice message from a calling party for the subscriber's telephone, forward the voice message to a mailbox for storage therein, and transmit a Short Message Services (SMS) message notification upon receipt of the voice message at the mailbox to provide an indication to the subscriber over the Internet of the stored voice message;
an Internet gateway for providing the message notification to the subscriber; and
a message receiving device for allowing the subscriber to receive the message notification.

21. The system of claim 20 wherein the voice response unit, in transmitting the message notification, is further operative to transmit a message notification to a messaging service node.

22. The system of claim 20 wherein the voice response unit is coupled to the messaging service node via a physical data link for transmitting signaling data to the messaging service node.

23. The system of claim 22 wherein the physical data link in an X.25 data link.

24. The system of claim 23, wherein the X.25 data link is an SMS data link.

25. For use in a communication network having at least one switch serving at least one telephone subscriber in the public wireless and wireline networks having a voice mail notification system, comprising:
at least one Internet gateway in communication with the communication network;
at least one database including a designated delivery destination corresponding to the at least one subscriber's voice mailbox; and
an adjunct processor in communication with the at least one Internet gateway and a messaging service center, wherein the adjunct processor is operative to query the at least one database to determine the designated destination server for the subscriber, instruct the messaging service center to route a Short Message Services (SMS) voice mail message notification to the at least one Internet gateway, and transmit to the at least one Internet gateway the determined server for delivery to the subscriber.

* * * * *